(12) United States Patent
Oshima et al.

(10) Patent No.: US 10,326,515 B2
(45) Date of Patent: Jun. 18, 2019

(54) ARRAY ANTENNA APPARATUS, RECEIVER, AND METHOD OF PROCESSING RECEIVED SIGNALS

(71) Applicant: NEC Corporation, Minato-ku, Tokyo (JP)

(72) Inventors: Naoki Oshima, Tokyo (JP); Ikuma Ando, Tokyo (JP)

(73) Assignee: NEC CORPORATION, Tokyo (JP)

( * ) Notice: Subject to any disclaimer, the term of this patent is extended or adjusted under 35 U.S.C. 154(b) by 21 days.

(21) Appl. No.: 15/566,802

(22) PCT Filed: Apr. 20, 2016

(86) PCT No.: PCT/JP2016/002105
§ 371 (c)(1),
(2) Date: Oct. 16, 2017

(87) PCT Pub. No.: WO2016/174853
PCT Pub. Date: Nov. 3, 2016

(65) Prior Publication Data
US 2018/0083689 A1    Mar. 22, 2018

(30) Foreign Application Priority Data
Apr. 27, 2015    (JP) .................................. 2015-090581

(51) Int. Cl.
*H04B 7/08*    (2006.01)
*H04L 7/00*    (2006.01)
*H04B 7/10*    (2017.01)

(52) U.S. Cl.
CPC ............ *H04B 7/082* (2013.01); *H04B 7/0828* (2013.01); *H04B 7/10* (2013.01); *H04L 7/0087* (2013.01)

(58) Field of Classification Search
CPC ............ H03D 2200/0025; H04B 1/005; H04B 1/006; H04B 1/0483; H04B 7/0822
See application file for complete search history.

(56) References Cited

U.S. PATENT DOCUMENTS 6,721,367 B1     4/2004  Miya et al.
7,277,679 B1 *  10/2007  Barratt .................. H04B 7/084
                                                    375/347

(Continued)

FOREIGN PATENT DOCUMENTS

JP      2000-151488 A     5/2000
JP      2000-252870 A     9/2000

(Continued)

OTHER PUBLICATIONS

International Search Report for PCT Application No. PCT/JP2016/002105, dated Jul. 19, 2016.

(Continued)

*Primary Examiner* — David S Huang

(57) ABSTRACT

When a radio frequency (RF) unit is provided with a delay line or a switch, as the number of arrays (the number of antennas) increases, the parasitic capacitance of the antennas increases and the insertion loss of the switch increases. In addition, the insertion loss may further increase at high frequencies expected to be used in the future. An array antenna apparatus of the present invention is provided with: a plurality of antennas that receive signals; a plurality of down-converters that are connected respectively to the plurality of antennas and that down-convert the received signals; and a switch that selects at least one signal from among the plurality of down-converted signals, and transmits the at least one signal to an A/D converter.

15 Claims, 10 Drawing Sheets

(56) References Cited

U.S. PATENT DOCUMENTS

| | | | | |
|---|---|---|---|---|
| 7,869,528 | B2* | 1/2011 | Robinson | H04B 1/0483 |
| | | | | 375/146 |
| 8,681,890 | B2* | 3/2014 | Petrovic | H04B 7/0408 |
| | | | | 375/267 |
| 2012/0044975 | A1 | 2/2012 | Lai et al. | |
| 2012/0119808 | A1* | 5/2012 | Motozawa | H04B 1/40 |
| | | | | 327/270 |

FOREIGN PATENT DOCUMENTS

| | | |
|---|---|---|
| JP | 2002-214318 A | 7/2002 |
| JP | 2009-124654 A | 6/2009 |
| JP | 2013-143632 A | 7/2013 |

OTHER PUBLICATIONS

English translation of Written opinion for PCT Application No. PCT/JP2016/002105.

* cited by examiner

ARRAY ANTENNA APPARATUS, RECEIVER, AND METHOD OF PROCESSING RECEIVED SIGNALS

This application is a National Stage Entry of PCT/JP2016/002105 filed on Apr. 20, 2016, which claims priority from Japanese Patent Application 2015-090581 filed on Apr. 27, 2015, the contents of all of which are incorporated herein by reference, in their entirety.

TECHNICAL FIELD

The present invention relates to an array antenna apparatus and, in particular, to reception of signal.

BACKGROUND ART

In recent years, with rapid expansion of radio communication, insufficiency of radio communication bands is becoming an issue. A system for sharing frequencies in terms of time and location such as cognitive radio has been proposed to resolve the shortage of frequencies. Given the increasing traffic of radio communication, however, the system is not used sufficiently widely.

Consequently, there is an increasing demand for beam-forming as a technique for improving the efficiency of the use of radio waves (frequencies) in terms of space. Beam-forming is a technique of giving directivity to the radio waves to be radiated, thereby radiating the radio waves only toward a particular direction where the receiver is. This improves signal quality and reduces unnecessary radiation to other radio devices and systems. In other words, beam-forming allows the use of radio waves in a more spatially divided manner.

One of the typical beam-forming techniques is a phased array antenna. A phased array antenna changes the phases of radio signals fed to a plurality of regularly arranged antenna elements. A phased array antenna thereby spatially combines radio waves radiated from the antenna elements and radiates the combined radio waves to a desired direction. A phased array antenna radiates radio waves to a desired direction by adjusting the electric phases and amplitudes. Therefore, phased array antennas are more durable than mechanically operated high directional antennas. Beam-forming requires, however, that the direction of the receiver should be known as a prior condition. One of the simplest techniques for specifying the direction of the receiver is a beam-former method, which employs a device that scans the radio waves that it radiates. Techniques with higher precision for direction-of-arrival estimation include Minimum Mean Square Error (MMSE) and Multiple Signal Classification (MUSIC) methods. The MMSE method uses a known signal such as a preamble included in the signals to change the phases and the weightings of amplitudes in an array antenna, thereby giving a desired directivity to the radio waves to be radiated. The MUSIC method computes separation and direction of arrival based on eigenvalues and eigenvectors of correlation values of a received signal. This enables direction-of-arrival estimation of a received signal even when it is an unknown signal. Precisely speaking, the MMSE method is not for direction-of-arrival estimation but is a technique called adaptive array for optimizing the phases and weightings of amplitude for each antenna element. Since both the MMSE and MUSIC methods require high precision operations by digital signal processing, the signals received by the antenna elements need to be converted to digital signals by analog-digital (A/D) converters. As the number of antenna elements increases, the number of A/D converters proportionally increases, resulting in power consumption and cost increases.

To address the increase in the number of A/D converters, PTL1 discloses a technique for performing a kind of parallel-serial conversion in which signals can be serially inputted to a single circuit by providing each antenna element with a delay line with a different delay amount and a switch. PTL2 discloses a time-division phased array technique in which time-division multiplexing is performed by using switches but not using delay lines, thereby reducing the number of analog circuits to be connected.

CITATION LIST

Patent Literature

[PTL1] Japanese Patent Application Laid-open No. 2002-214318

[PTL2] Japanese Patent Application Laid-open No. 2013-143632

SUMMARY OF INVENTION

Technical Problem

However, when the delay lines and switches are provided for RF (Radio Frequency) unit according to the techniques disclosed in PTL1 and PTL2, this poses an issue that insertion loss in the switches increases as the number of array components (the number of antennas) increases. In addition, insertion loss will be increased at high frequencies expected to be used in the future.

An object of the present invention is to provide an array antenna apparatus with reduced insertion loss in switches.

Solution to Problem

An array antenna apparatus according an aspect of the present invention includes: a plurality of antennas to receive signals, a plurality of down-converters respectively connected to the plurality of antennas to down-convert the received signals, and a switch to select at least one signal from among the plurality of down-converted signals and to transmit the at least one signal to an A/D converter.

Advantageous Effect of Invention

The present invention has advantageous effects of reducing insertion loss in switches of an array antenna apparatus and a receiver.

DESCRIPTION OF EMBODIMENTS

Figure 1:
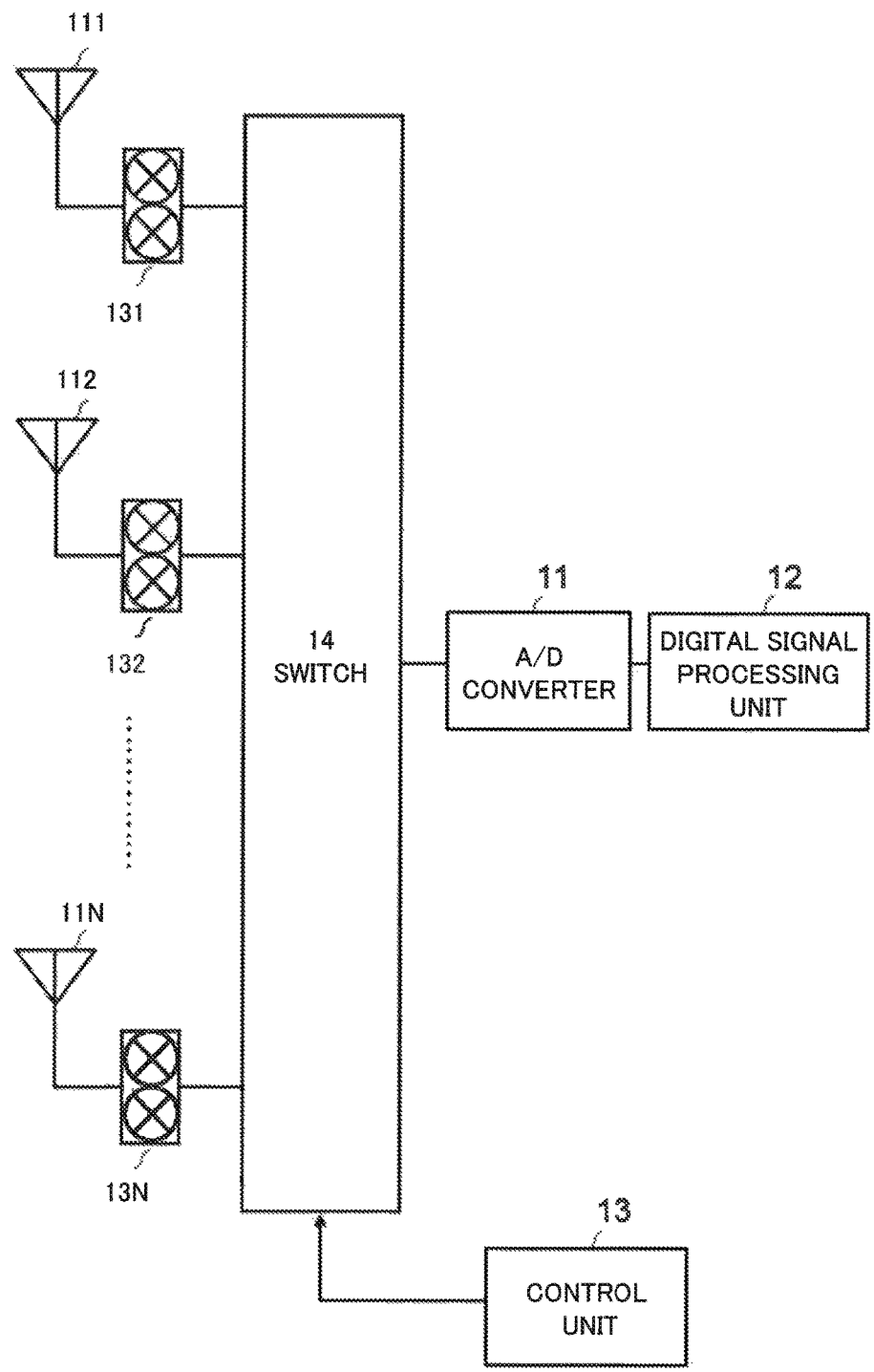
FIG. 1 is a block diagram illustrating a configuration of an array antenna apparatus 1 according to a first example embodiment of the present invention.

Hereinbelow, example embodiments for working the present invention will be described in detail with reference to drawings. Same constituent elements having same functions are denoted by same reference numerals, throughout the drawings and the example embodiments recited in the Description.

First Example Embodiment

FIG. 1 is a block diagram illustrating a configuration of an array antenna apparatus 1 according to a first example embodiment of the present invention.

With reference to FIG. 1, the array antenna apparatus 1 according to the first example embodiment of the present invention includes antennas (antenna elements) 111, 112, . . . , and 11N (N is an integer not smaller than 2), down-converters 131, 132, . . . , and 13N, a switch 14, an A/D converter 11, a digital signal processing unit 12, and a control unit 13. This enables the array antenna apparatus 1 to perform a precise direction-of-arrival estimation of a received signal by digital signal processing. In performing the direction-of-arrival estimation, the array antenna apparatus 1 restrains power consumption and cost increases by limiting the number of A/D converters 11.

The constituent elements included by the array antenna apparatus 1 according to the first example embodiment will be described below.

Herein, the configuration up to the down-converters 131, 132, . . . , and 13N (the antennas 111, 112, . . . , and 11N and the down-converters 131, 132, . . . , and 13N) is called as the RF unit, which handles radio frequency (RF) signals. The configuration subsequent to the down-converters 131, 132, . . . , and 13N (the switch 14, the A/D converter 11, and the digital signal processing unit 12) is called as the BB unit, which handles down-converted base band (BB) signals. In the BB unit, the configuration prior to the A/D converter 11 (the switch 14) is particularly called as the analog-BB unit, and the configuration including and subsequent to the A/D converter 11 (the A/D converter 11 and the digital signal processing unit 12) is called as the digital-BB unit.

The antennas 111, 112, . . . , and 11N receive signals from other equipment. The antennas 111, 112, . . . , and 11N transmit the received signals to the down-converters 131, 132, . . . , and 13N. The antennas 111, 112, . . . , and 11N and the down-converters 131, 132, . . . , and 13N are respectively connected one to one in series.

The down-converters 131, 132, . . . , and 13N down-convert the signals received from the antennas 111, 112, . . . , and 11N. The down-converters 131, 132, . . . , and 13N are driven by LO signals transmitted by a local oscillator (LO) (not illustrated). Each of the down-converters 131, 132, . . . , and 13N transmits the down-converted signals to the A/D converter 41 via the switch 14.

The switch 14 electrically connects each of the down-converters 131, 132, . . . , and 13N and the A/D converter 11. The switch 14 receives signals from each of the down-converters 131, 132, . . . , and 13N, selects one signal from among the plurality of received signals based on a first control signal transmitted by the control unit 13, and transmits the signal to the A/D converter 11. In other words, the switch 14 switches between the signals to be transmitted to the A/D converter 11 based on the first control signal. The switch 14 according to the present example embodiment is a multiple-input single-output switch. However, the configuration of the switch 14 may be not limited to the multiple-input single-output switch. The switch 14 may be such a configuration as including N single-input single-output switches. When there are M units of A/D converters 11 (M is an integer satisfying $2 \le M \le N$), the switch 14 may be composed as a multiple-input multiple-output switch. In such a case, the switch 14 selects M signals out of a plurality of signals, and transmits them to the M units of A/D converters 11, transmitting one signal to each A/D converter 11.

The A/D converter 11 receives signals from the switch 14. The A/D converter 11 performs sampling and analog-digital conversion (A/D conversion) of the received signals. The A/D converter 11 transmits the converted signals (digital signals) to the digital signal processing unit 12. One A/D converter 11 is provided in the present example embodiment. However, more than one A/D converter 11 may be provided. When the number of A/D converters 11 is smaller than the number of antennas (the number of array components) N, the array antenna apparatus 1 operates at a reduced power consumption with lower cost. The sampling frequency of the A/D converters 11 can be proportionately lowered by increasing the number of the A/D converters 11. For example, let the sampling frequency of a non-arrayed antenna (oversampling) be $F_O$, the number of array components be N, and the number of the A/D converters 11 be M (M is an integer satisfying $1 \le M \le N$), then the necessary sampling frequency $F_S$ is (N/M) times the original frequency $F_O$.

The digital signal processing unit 12 receives signals (digital signals) from the A/D converter 11, and performs digital signal processing. The digital signal processing unit 12 changes the order of the received signals, in accordance with the timings of the switch 14 switching among the electrical connections of the down-converters 131, 132, . . . , and 13N with the A/D converter 11. Since the digital signal processing unit 12 receives signals every time the A/D converter 11 performs sampling (see FIG. 2), the received signals need to be stored separately in N units of buffers. When the array antenna apparatus 1 according to the present example embodiment is used as a receiver for direction-of-arrival estimation, the digital signal processing unit 12 performs digital signal processing by MMSE method, MUSIC method or the like. However, since this is not a main point of the present invention, the specific description for such method is omitted.

The control unit 13 controls the operation of the switch 14. The control unit 13 generates a first control signal to cause the switch 14 to select one of the plurality of signals to be transmitted to the A/D converter 11, and transmits the generated first control signal to the switch 14. The control unit 13 synchronizes the timings of the sampling by the A/D converter 11 and the timings of the electrical connection by the switch 14 of each of the down-converters 131, 132, . . . , and 13N with the A/D converter 11. The first control signal contains a piece of information on the order in which the switch 14 is to transmit the plurality of signals to the A/D converter 11. For example, the first control signal contains a piece of information that indicates that the switch 14 is to transmit the signals received from the down-converters 131, 132, . . . , and 13N to the A/D converter 11 in this sequence (down-converter 131→132→ . . . →13N). Based on this piece of information, the switch 14 sequentially transmits the plurality of signals to the A/D converter 11. Note that the information contained in the first control signal may not be limited to the above-described example. For example, the first control signal may contain, instead of a piece of information indicating to the switch 14 an order of transmission of the plurality of signals, a piece of information specifying a signal to be transmitted at every sampling timing. In such a case, the control unit 13 transmits a latest first control signal to the switch 14 at every sampling timing of the A/D converter 11.

Figure 2:
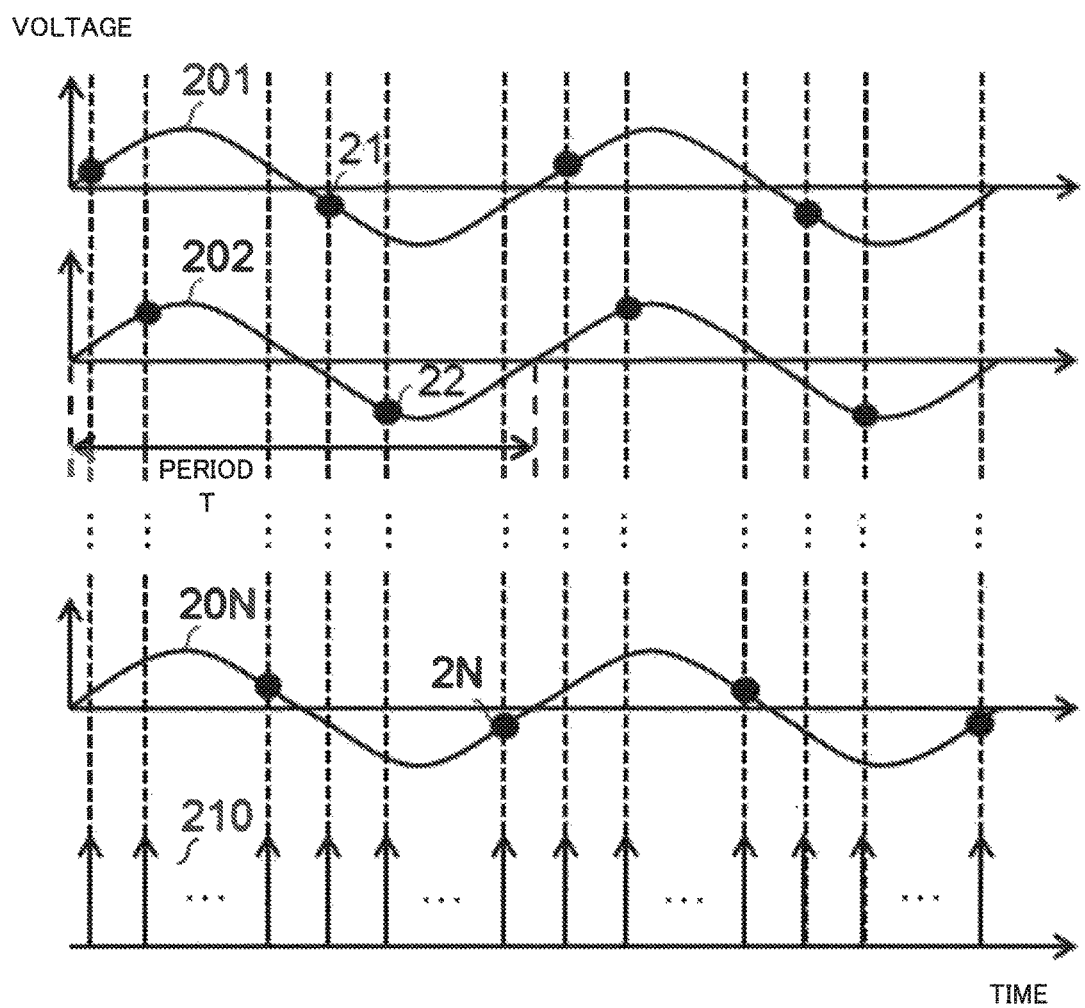
FIG. 2 is a graph illustrating the waveforms of received signals inputted to a switch 14 according to the first example embodiment of the present invention.

Operations in the present example embodiment will be described with reference to FIG. 2.

The graphs 201, 202, . . . , and 20N respectively illustrate the waveforms of received signals to be input to the switch 14. The graphs 201, 202, . . . , and 20N are illustrated as having an identical waveform for the sake of simplicity. However, when the switch 14 receives a plurality of signals in different phases as with a real phased array, the graphs 201, 202, . . . , and 20N will present waveforms different from each other.

The graph 210 illustrates the timings of sampling by the A/D converter 11. The control unit 13 performs control in such a way that the switch 14 sequentially transmits the selected signals to the A/D converter 11 at these timings. According to sampling theorem, when the sampling frequency of the A/D converter 11 is not smaller than N times the signal frequency (the reciprocal of the period T in FIG. 2), the samples of the signal (signal samples) 21, 22, . . . , and 2N match the spectrum of the original signal (the original signal can be reconstructed from the signal samples). The signal samples 21, 22, . . . , and 2N are sequentially taken at delayed timings with intervals equivalent to one clock cycle. Therefore, when the array antenna apparatus 1 according to the present example embodiment is used for direction-of-arrival estimation, it is necessary to set a sampling frequency high enough to avoid the effects of the delay amount of one clock cycle on the results of the direction-of-arrival estimation.

Figure 3:
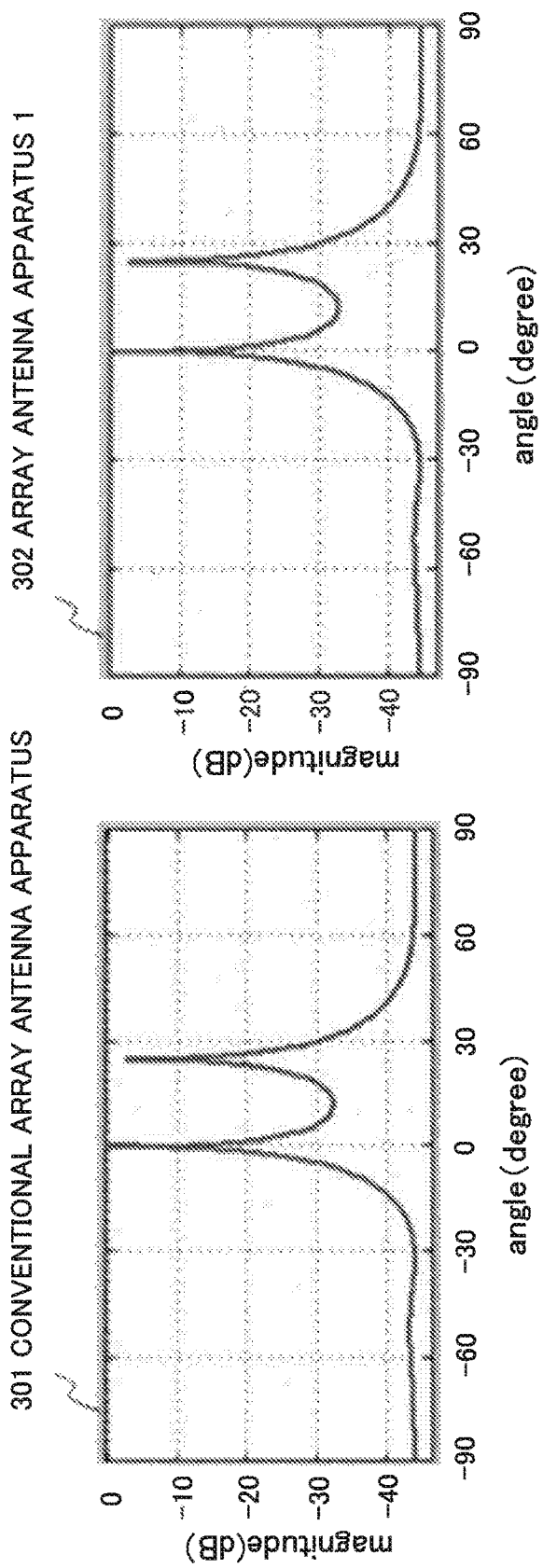
FIG. 3 is a simulation result of direction-of-arrival estimation using the array antenna apparatus 1 according to the first example embodiment of the present invention.

FIG. 3 illustrates a simulation result of direction-of-arrival estimation using the array antenna apparatus 1. The horizontal axis represents arrival angle of a signal, and the vertical axis represents magnitude of correlation value. The larger the correlation value is, the more probable it is that a signal is arriving. FIG. 3 illustrates a result of direction-of-arrival estimation by the MUSIC method, when independent signals arrive from the directions of 0° and 25°. The result 301 is a result of simulation using a conventional configuration of array antenna apparatus (not illustrated). The result 302 is a result of simulation using the array antenna apparatus 1 according to the present example embodiment, wherein the sampling frequency $F_S$ of the A/D converter 11 is the number of array components N (in the present simulation N=3) multiplied by four. As can be seen from the result 301 and the result 302, with a high sampling frequency, the array antenna apparatus 1 according to the first example embodiment of the present invention achieves the same result in direction-of-arrival estimation as the conventional array antenna apparatus. In the present simulations, the MUSIC method was used in direction-of-arrival estimation. Direction-of-arrival estimation using the array antenna apparatus 1 according to the present example embodiment may be conducted not only by this method but by employing other methods.

The array antenna apparatus 1 according to the first example embodiment is provided with the switch 14 in the BB unit, which handles down-converted base band (BB) signals. This allows the array antenna apparatus 1 to have a reduced insertion loss caused in the switch 14. In addition, the insertion loss in the switch 14 will be reduced even with high frequencies. These advantageous effects can also be obtained in the following example embodiments and will not be repeated in the following.

Second Example Embodiment

Figure 4:
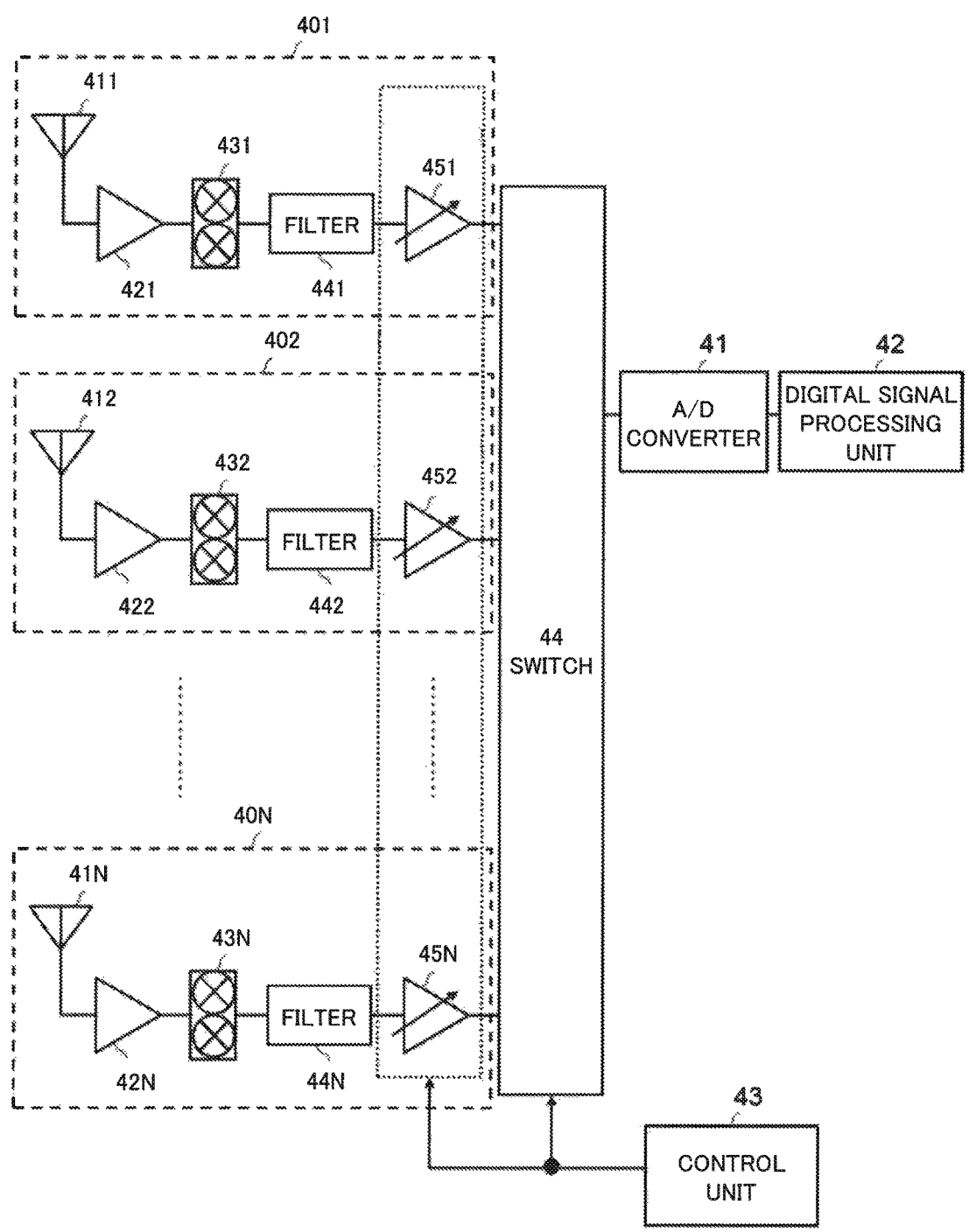
FIG. 4 is a block diagram illustrating a configuration of an array antenna apparatus 4 according to a second example embodiment of the present invention.

FIG. 4 is a block diagram illustrating a configuration of an array antenna apparatus 4 according to a second example embodiment of the present invention.

With reference to FIG. 4, the array antenna apparatus 4 according to the second example embodiment of the present invention includes receiver units 401, 402, . . . , and 40N (N is an integer not smaller than 2), a switch 44, an A/D converter 41, a digital signal processing unit 42, and a control unit 43. The array antenna apparatus 4, the switch 44, the A/D converter 41, and the digital signal processing unit 42 have the same functions as the array antenna apparatus 1, the switch 14, the A/D converter 11, and the digital signal processing unit 12 according to the first example embodiment, and will not be described in detail. The array antenna apparatus 4 according to the present example embodiment differs from the array antenna apparatus 4 according to the first example embodiment in that the former further includes low noise amplifiers 421, 422, . . . , and 42N, filters 441, 442, . . . , and 44N, and variable gain amplifiers 451, 452, . . . , and 45N.

The constituent elements included by the array antenna apparatus 4 according to the second example embodiment will be described below.

The receiver units 401, 402, . . . , and 40N include respective antennas (antenna elements) 411, 412, . . . , and 41N, respective low noise amplifiers 421, 422, . . . , and 42N, respective down-converters 431, 432, . . . , and 43N, respective filters 441, 442, . . . , and 44N, and respective variable gain amplifiers 451, 452, . . . , and 45N. The antennas 411, 412, . . . , and 41N and the down-converters 431, 432, . . . , and 43N have the same functions as the antennas 111, 112, . . . , and 11N and the down-converters 131, 132, . . . , and 13N according to the first example embodiment, and will not be described in detail. Each of the receiver units 401, 402, . . . , and 40N receives a signal from other equipment, and transmits the received signal to the A/D converter 41 via the switch 44.

Herein, the configuration former the down-converters 431, 432, . . . , and 43N (the antennas 411, 412, . . . , and 41N, the low noise amplifiers 421, 422, . . . , and 42N, and the down-converters 431, 432, . . . , and 43N) is called as the RF unit, which handles radio frequency signals. The configuration subsequent to the down-converters 431, 432, ..., and 43N (the filters 441, 442, ..., and 44N, the variable gain amplifiers 451, 452, ..., and 45N, the switch 44, the A/D converter 41, and the digital signal processing unit 42) is called as the BB unit, which handles down-converted BB signals. In the BB unit, the configuration prior to the A/D converter 41 (the filters 441, 442, ..., and 44N, the variable gain amplifiers 451, 452, ..., and 45N, and the switch 44) is particularly called as the analog-BB unit, and the configuration including and subsequent to the A/D converter 41 (the A/D converter 41 and the digital signal processing unit 42) is called as the digital-BB unit.

The low noise amplifiers 421, 422, ..., and 42N amplify the signals received by the antennas 411, 412, ..., and 41N, and transmit the signals to the down-converters 431, 432, ..., and 43N. The antennas 411, 412, ..., and 41N, the low noise amplifiers 421, 422, ..., and 42N, and the down-converters 431, 432, ..., and 43N are respectively connected one to one to one in series in this order.

The filters 441, 442, ..., and 44N pass only a certain (frequency) band of the signals transmitted by the down-converter 431, 432, ..., and 43N, and transmit the signals to the variable gain amplifiers 451, 452, ..., and 45N. The down-converters 431, 432, ..., and 43N, the filters 441, 442, ..., and 44N, and the variable gain amplifiers 451, 452, ..., and 45N are respectively connected one to one to one in series in this order.

The variable gain amplifiers 451, 452, ..., and 45N amplify the signals transmitted by the filters 441, 442, ..., and 44N, and transmit the signals to the switch 44. The filters 441, 442, ..., and 44N and the variable gain amplifiers 451, 452, ..., and 45N are respectively connected one to one in series in this order. Each of the variable gain amplifiers 451, 452, ..., and 45N changes its gain based on a second control signal transmitted by the control unit 43. The gains of the variable gain amplifiers 451, 452, ..., and 45N are always of the same value. Therefore, when the variable gain amplifiers 451, 452, ..., and 45N change their gains, the amount of change in the gains will be the same for all variable gain amplifiers 451, 452, ..., and 45N. When the received signal is weak, the variable gain amplifiers 451, 452, ..., and 45N increase their gains based on the second control signal. This enables the array antenna apparatus 4 to perform a normal A/D conversion of the received signal. In an opposite case where the received signal is strong, the variable gain amplifiers 451, 452, ..., and 45N decrease their gains. This allows the array antenna apparatus 4 to operate at a reduced power consumption. According to the present example embodiment, the variable gain amplifiers 451, 452, ..., and 45N have variable gains but they may have invariable gains. Further, in the present example embodiment, the variable gain amplifiers 451, 452, ..., and 45N may be omitted.

The control unit 43 has a function as described below in addition to the functions of the control unit 13 according to the first example embodiment. The control unit 43 generates the second control signal to change the amplification factors of the variable gain amplifiers 451, 452, ..., and 45N, and transmits the generated second control signal to each of the variable gain amplifiers 451, 452, ..., and 45N. The second control signal contains a piece of information in accordance with which each of the variable gain amplifiers 451, 452, ..., and 45N changes the amplification factor in response to the magnitude of the signal it receives. The control unit 43 need not generate the second control signal when the amplification factors of the variable gain amplifiers 451, 452, ..., and 45N are constant.

In the above, the first and second control signals are described as being generated by one and the same control unit 43. However, these first and second control signals may be separately generated by different control units (not illustrated).

The array antenna apparatus 4 according to the present example embodiment has been described in a configuration of the array antenna apparatus 4 functioning as a common receiver and the internal composition of the receiver units 401, 402, ..., and 40N, the location of the switch 44, and the like may be changed as appropriate. Note, however, the location of the switch 44 may be changed within the BB unit.

The array antenna apparatus 4 according to the second example embodiment is provided, in the receiver units 401, 402, ..., and 40N, with respective low noise amplifiers 421, 422, ..., and 42N, respective filters 441, 442, ..., and 44N, and respective variable gain amplifier 451, 452, ..., and 45N. This allows a normal A/D conversion, even when the received signal is weak or when the received signal has strong noise.

Third Example Embodiment

Figure 5:
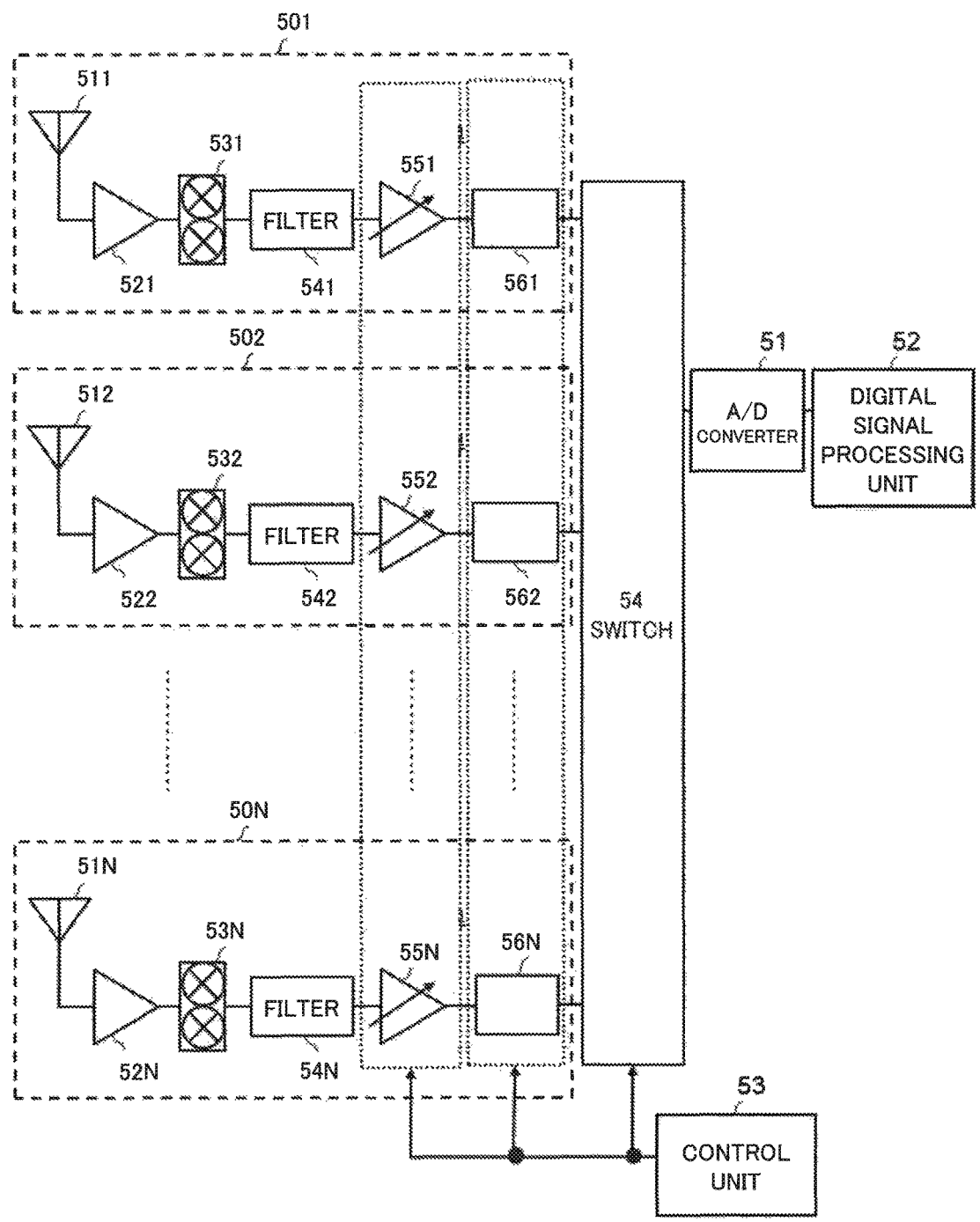
FIG. 5 is a block diagram illustrating a configuration of an array antenna apparatus 5 according to a third example embodiment of the present invention.

FIG. 5 is a block diagram illustrating a configuration of an array antenna apparatus 5 according to a third example embodiment of the present invention.

With reference to FIG. 5, the array antenna apparatus 5 according to the third example embodiment of the present invention includes receiver units 501, 502, ..., and 50N (N is an integer not smaller than 2), a switch 54, an A/D converter 51, a digital signal processing unit 52, and a control unit 53. The array antenna apparatus 5, the switch 54, the A/D converter 51, and the digital signal processing unit 52 have the same functions as the array antenna apparatus 1, the switch 14, the A/D converter 11, and the digital signal processing unit 12 according to the first example embodiment, and will not be described in detail. Note, however, that the sampling frequency $F_S$ of the A/D converter 51 is $F_O$, where $F_O$ is a sampling frequency (oversampling) of a non-arrayed antenna. In other words, the A/D converter 51 according to the present example embodiment has no need for oversampling at a frequency higher than that of a non-arrayed antenna, unlike the first and second example embodiments. The receiver units 501, 502, ..., and 50N and the control unit 53 have the same functions as the receiver units 401, 402, ..., and 40N and the control unit 43 according to the second example embodiment, and will not be described in detail. The array antenna apparatus 5 according to the present example embodiment differs in that it further includes delay devices 561, 562, ..., and 56N in the receiver units 401, 402, ..., and 40N according to the second example embodiment.

The constituent elements included by the array antenna apparatus 5 according to the third example embodiment will be described below.

The receiver units 501, 502, ..., and 50N include respective antennas (antenna elements) 511, 512, ..., and 51N, respective low noise amplifiers 521, 522, ..., and 52N, respective down-converters 531, 532, ..., and 53N, respective filters 541, 542, ..., and 54N, respective variable gain amplifiers 551, 552, ..., and 55N, and respective delay devices 561, 562, ..., and 56N. The antennas 511, 512, ..., and 51N and the down-converters 531, 532, ..., and 53N have the same functions as the antennas 111, 112, ..., and 11N and the down-converters 131, 132, ..., and 13N according to the first example embodiment, and will not be described in detail. The low noise amplifiers 521, 522, . . . , and 52N, the filters 541, 542, . . . , and 54N, and the variable gain amplifiers 551, 552, . . . , and 55N have the same functions as the low noise amplifiers 421, 422, . . . , and 42N, the filters 441, 442, . . . , and 44N, and the variable gain amplifiers 451, 452, . . . , and 45N according to the second example embodiment, and will not be described in detail.

Herein, the configuration up to the down-converters 531, 532, . . . , and 53N (the antennas 511, 512, . . . , and 51N, the low noise amplifiers 521, 522, . . . , and 52N, and the down-converters 531, 532, . . . , and 53N) is called as the RF unit, which handles radio frequency signals. The configuration subsequent to the down-converters 531, 532, . . . , and 53N (the filters 541, 542, . . . , and 54N, the variable gain amplifiers 551, 552, . . . , and 55N, the delay devices 561, 562, . . . , and 56N, the switch 54, the A/D converter 51, and the digital signal processing unit 52) is called as the BB unit, which handles down-converted BB signals. In the BB unit, the configuration prior to the A/D converter 51 (the filters 541, 542, . . . , and 54N, the variable gain amplifiers 551, 552, . . . , and 55N, the delay devices 561, 562, . . . , and 56N, and the switch 54) is particularly called as the analog-BB unit, and the configuration including and subsequent to the A/D converter 51 (the A/D converter 51 and the digital signal processing unit 52) is called as the digital-BB unit.

The delay devices 561, 562, . . . , and 56N respectively adjust the periods of time in which the signals transmitted by the variable gain amplifiers 551, 552, . . . , and 55N reach the switch 54. The variable gain amplifiers 551, 552, . . . , and 55N and the delay devices 561, 562, . . . , and 56N are respectively connected one to one in series in this order. The delay devices 561, 562, . . . , and 56N change the delay amounts of the signals (the periods of time in which the signals reach the switch 54) based on the first control signal transmitted by the control unit 53. More specifically, the delay devices 561, 562, . . . , and 56N change the delay amounts of the signals, based on a piece of information contained in the first control signal on the order of transmission by the switch 54 of a plurality of signals, in such a way that the delay amounts for the signals to be transmitted are increased in that order. In other words, of the signals to be transmitted by the delay devices 561, 562, . . . , and 56N, the signal first in the order of transmission to the A/D converter 51 is given a smallest delay amount and the signal last in the order of transmission to the A/D converter 51 is given a largest delay amount. For example, when the first control signal contains a piece of information indicating that the signals to be transmitted by the delay devices 561, 562, . . . , and 56N are transmitted to the A/D converter 51 in this order (the delay devices 561→562→ . . . →56N), the delay devices 561, 562, . . . , and 56N cumulatively increase the delay amounts of respective signals by one sampling time period in this order. This makes the delays by the delay devices 561, 562, . . . , and 56N correspond to the delays at the switch 54 for waiting for the sampling by the A/D converter 51, with regard to each received signal. In other words, the delay devices 561, 562, . . . , and 56N achieve the sampling of the plurality of received signals at an identical timing even when the switch 54 transmits the received signals to the A/D converter 51 sequentially (not transmit simultaneously). The A/D converter 51 thereby can avoid setting a high sampling frequency.

Figure 6:
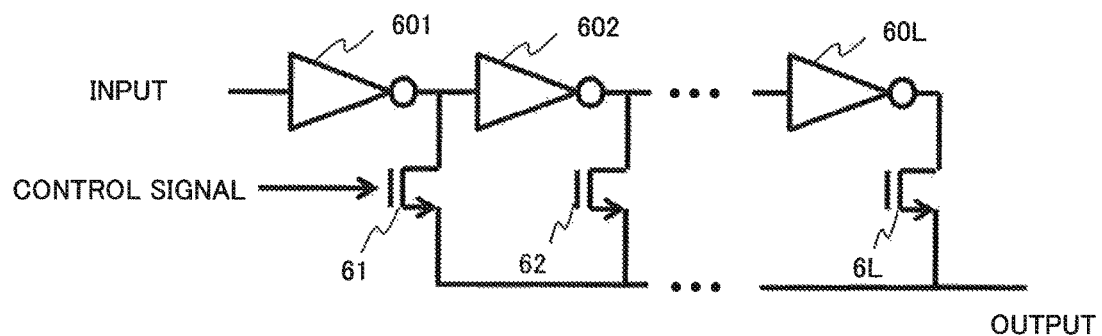
FIG. 6 is a circuit diagram illustrating a configuration of delay devices 561, 562, . . . , and 56N according to the third example embodiment of the present invention.

FIG. 6 is a circuit diagram of a delay device 6 representing the delay devices 561, 562, . . . , and 56N according to the third example embodiment of the present invention.

The delay device 6 is an inverter chain in which inverters 601, 602, . . . , 60L (L is an integer not smaller than 1) are connected in series. The delay device 6 utilizes delays resulting from the passage of a signal through the inverters 601, 602, . . . , 60L. The delay device 6 can determine the number of inverters that a signal passes through by selectively causing MOS switches 61, 62, . . . , 6L to be conductive. The delay device 6 thereby can change the delay amount. As it is not desirable that the delay amount should affect signal gain, the inverters 601, 602, . . . , 60L preferably include a resistor feedback configuration to have a gain of factor 1.

Figure 7:
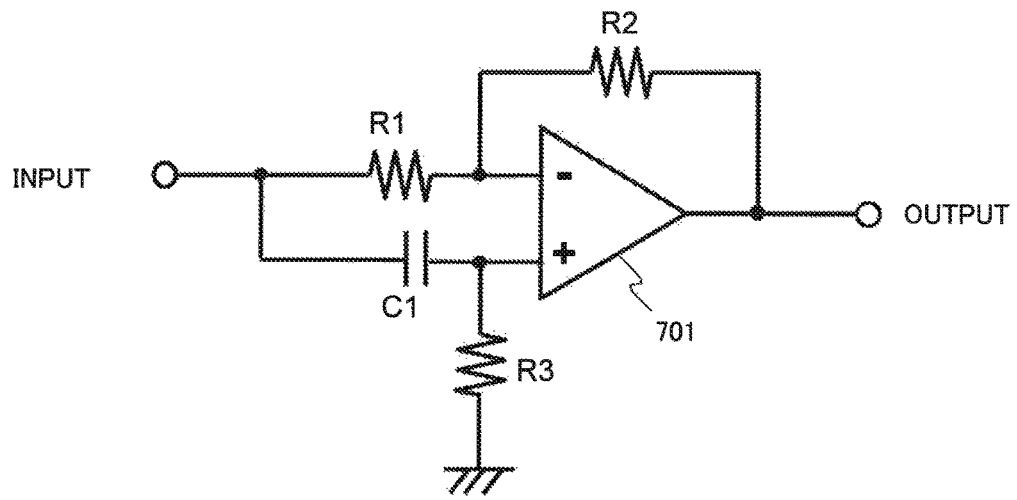
FIG. 7 is a circuit diagram illustrating a configuration of delay devices 561, 562, . . . , and 56N according to the third example embodiment of the present invention.

FIG. 7 is a circuit diagram of a delay device 7 representing the delay devices 561, 562, . . . , and 56N according to the third example embodiment of the present invention.

The delay device 7 is an all-pass filter including an operational amplifier 701. When variable resistances R1, R2, and R3 and a variable capacity C1 are used as load for the all-pass filter 701, the equation below stands.

[Math. 1]

$$Vout = \left\{\frac{-R2}{R1} + \left(\frac{R1+R2}{R1}\right)\left(\frac{R3}{R3+\frac{1}{j\omega C1}}\right)\right\} Vin \quad (1)$$

Herein j is a complex number. This equation can be simplified to the following equation when R1=R2.

[Math. 2]

$$Vout = \frac{j\omega C1R3 - 1}{j\omega C1R3 + 1} Vin \quad (2)$$

This is expressed as a transfer function as in the following.

[Math. 3]

$$H = \frac{S - \frac{1}{C1R3}}{S + \frac{1}{C1R3}} \quad (3)$$

The value of the above equation is 1. The phase θ is expressed as in the following equation.

[Math. 4]

$$\theta = \tan^{-1}\left(\frac{-2\omega C1R3}{1 - (\omega C1R3)^2}\right) \quad (4)$$

Herein "tan$^{-1}$" denotes arc tangent. The equations (2) and (3) show that the all-pass filter 701 is a circuit that does not affect signal amplitudes but changes phases only. Therefore, by changing the value of the variable resistance R3 or the variable capacity C1, it is possible to change the phase, i.e., delay amount. Further, the equation (4) shows that the all-pass filter 701 can change the phase only up to 180° but, when a phase change of more than 180° is desired, all-pass filters can be disposed in multiple stages.

The array antenna apparatus 5 according to the third example embodiment is provided with the delay devices 561, 562, . . . , and 56N respectively in the receiver units 501, 502, . . . , and 50N. This enables the sampling of the received signals at an identical timing (A/D conversion at an identical timing) even when the switch 54 electrically connects the receiver units 501, 502, . . . , and 50N with the A/D converter 51 at different timings. In other words, the array antenna apparatus 5 can perform A/D converter processing at a sampling rate lower than usual, thereby operating at a reduced power consumption. Further, since in the present example embodiment the delay devices 561, 562, . . . , and 56N are disposed in the BB unit, which handles down-converted signals, the received signals do not depend on RF frequency. Therefore, the array antenna apparatus 5 can be used in a broad band.

Fourth Example Embodiment

Figure 8:
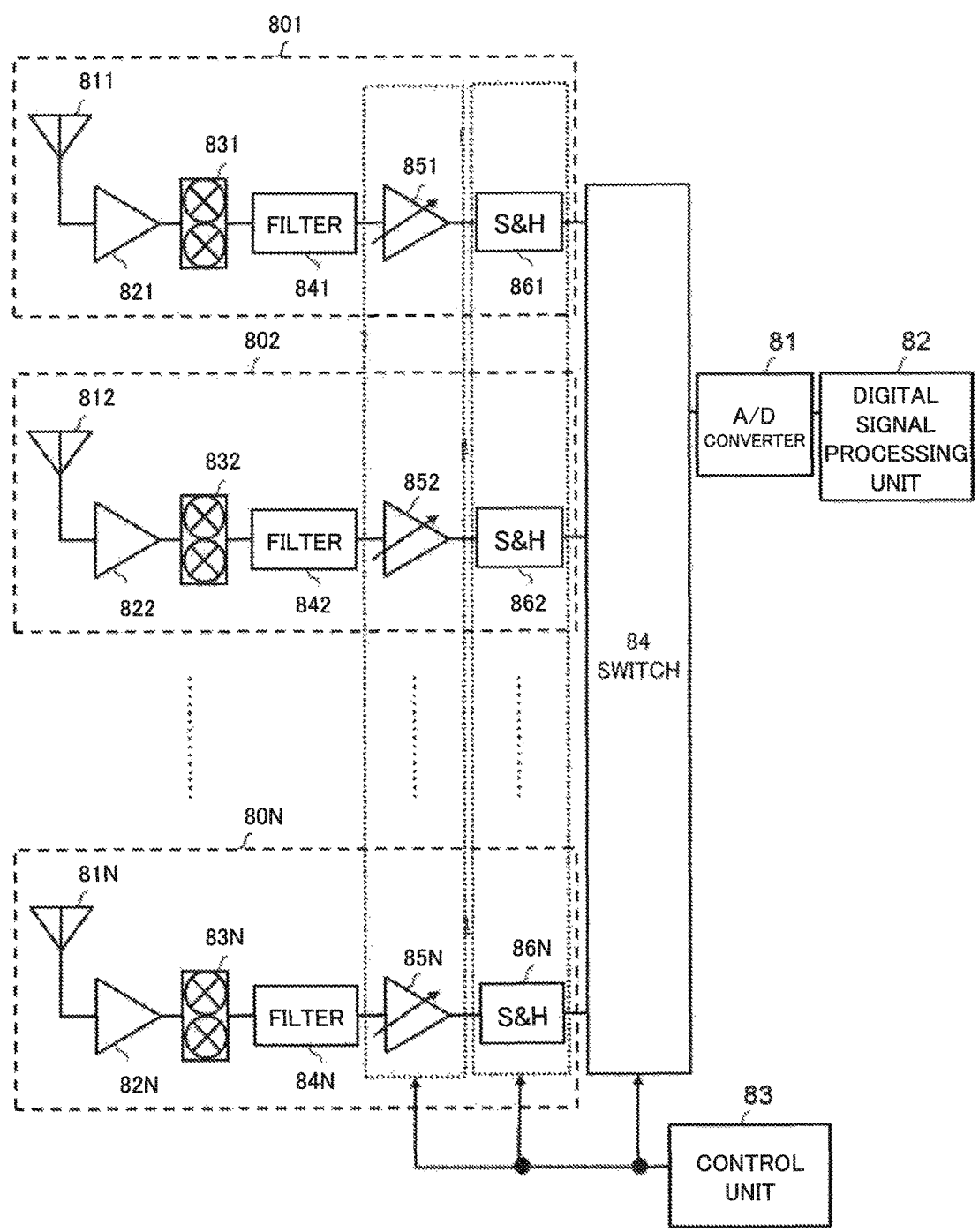
FIG. 8 is a block diagram illustrating a configuration of an array antenna apparatus 8 according to a fourth example embodiment of the present invention.

FIG. 8 is a block diagram illustrating an array antenna apparatus 8 according to a fourth example embodiment of the present invention.

With reference to FIG. 8, the array antenna apparatus 8 according to the fourth example embodiment of the present invention includes receiver units 801, 802, . . . , and 80N (N is an integer not smaller than 2), a switch 84, an A/D converter 81, a digital signal processing unit 82, and a control unit 83. The array antenna apparatus 8, the switch 84, and the digital signal processing unit 82 have the same functions as the array antenna apparatus 1, the switch 14, and the digital signal processing unit 12 according to the first example embodiment, and will not be described in detail. The receiver units 801, 802, . . . , and 80N and the control unit 53 have the same functions as the receiver units 401, 402, . . . , and 40N and the control unit 43 according to the second example embodiment, and will not be described in detail. The array antenna apparatus 8 according to the present example embodiment differs in that it further includes sample and hold circuits 861, 862, . . . , and 86N respectively in the receiver units 401, 402, . . . , and 40N according to the second example embodiment.

The constituent elements included by the array antenna apparatus 8 according to the fourth example embodiment will be described below.

The A/D converter 81 has the same functions as the A/D converter 11 according to the first example embodiment, except for the function of sampling the received signals (in other words, the A/D converter 81 does not perform signal sampling). Hence the details will not be described. Note, however, that the sampling frequency $F_S$ of the A/D converter 81 is $F_O$, as in the third example embodiment, where $F_O$ is a sampling frequency (oversampling) of a non-arrayed antenna. In other words, the A/D converter 81 according to the present example embodiment has no need for oversampling, unlike the first and second example embodiments.

The receiver units 801, 802, . . . , and 80N include respective antennas (antenna elements) 811, 812, . . . , and 81N, respective low noise amplifiers 821, 822, . . . , and 82N, respective down-converters 831, 832, . . . , and 83N, respective filters 841, 842, . . . , and 84N, respective variable gain amplifiers 851, 852, . . . , and 85N, and respective sample and hold circuits 861, 862, . . . , and 86N. The antennas 811, 812, . . . , and 81N and the down-converters 831, 832, . . . , and 83N have the same functions as the antennas 111, 112, . . . , and 11N and the down-converters 131, 132, . . . , and 13N according to the first example embodiment, and will not be described in detail. The low noise amplifiers 821, 822, . . . , and 82N, the filters 841, 842, . . . , and 84N, and the variable gain amplifiers 851, 852, . . . , and 85N have the same functions as the low noise amplifiers 421, 422, . . . , and 42N, the filters 441, 442, . . . , and 44N, and the variable gain amplifiers 451, 452, . . . , and 45N according to the second example embodiment, and will not be described in detail.

Herein, the configuration up to the down-converters 831, 832, . . . , and 83N (antennas 811, 812, . . . , and 81N, the low noise amplifiers 821, 822, . . . , and 82N, the down-converters 831, 832, . . . , and 83N) is called as the RF unit, which handles radio frequency signals. The configuration subsequent to the down-converters 831, 832, . . . , and 83N (the filters 841, 842, . . . , and 84N, the variable gain amplifiers 851, 852, . . . , and 85N, the sample and hold circuits 861, 862, . . . , and 86N, the switch 84, the A/D converter 81, and the digital signal processing unit 82) is called as the BB unit, which handles down-converted BB signals. In the BB unit, the configuration prior to the A/D converter 81 (the filters 841, 842, . . . , and 84N, the variable gain amplifiers 851, 852, . . . , and 85N, the sample and hold circuits 861, 862, . . . , and 86N, and the switch 84) is particularly called as the analog-BB unit, and the configuration including and subsequent to the A/D converter 81 (the A/D converter 81 and the digital signal processing unit 82) is called as the digital-BB unit.

The sample and hold circuits 861, 862, . . . , and 86N perform sampling of the signals received from the variable gain amplifiers 851, 852, . . . , and 85N, hold the signal samples, and transmit the signal samples to the switch 84. The variable gain amplifiers 851, 852, . . . , and 85N and the sample and hold circuits 861, 862, . . . , and 86N are respectively connected one to one in this order. The sample and hold circuits 861, 862, . . . , and 86N synchronize the sampling timings based on a third control signal transmitted by the control unit 83. The sample and hold circuits 861, 862, . . . , and 86N hold the signals based on the first control signal transmitted by the control unit 83. More specifically, the sample and hold circuits 861, 862, . . . , and 86N change the respective holding times of the signals, based on a piece of information contained in the first control signal on the order of transmission by the switch 84 of a plurality of signals, in such a way that the order in which the sample and hold circuits 861, 862, . . . , and 86N transmit the signals to the switch 84 matches that order. In other words, the sample and hold circuits 861, 862, . . . , and 86N set a shortest hold time for the received signal first in the order of transmission to the A/D converter 81 and a longest hold time for the received signal last in the order of transmission to the A/D converter 81. For example, when the first control signal contains a piece of information indicating that the signals of the receiver units 801, 802, . . . , and 80N are to be transmitted to the A/D converter 81 in this order (the receiver units 801→802→ . . . →80N), the sample and hold circuits 861, 862, . . . , and 86N make the respective hold times increasingly longer in this order.

The control unit 83 has a function as described below in addition to the functions of the control unit 43 according to the second example embodiment. The control unit 83 generates the third control signal to synchronize the timings of sampling by the sample and hold circuits 861, 862, . . . , and 86N, and transmits the generated third control signal to each of the sample and hold circuits 861, 862, . . . , and 86N. The third control signal contains a piece of information in accordance with which the sample and hold circuits 861, 862, . . . , and 86N perform sampling of the received signals simultaneously.

In the above, the first to third control signals are described as being generated by one and the same control unit 83.

However, these first to third control signals may be generated by a plurality of control units (not illustrated).

The array antenna apparatus 8 according to the fourth example embodiment is provided with the sample and hold circuits 861, 862, . . . , and 86N respectively in the receiver units 801, 802, . . . , and 80N. This allows the array antenna apparatus 8 to separate the sampling function performed by the A/D converter in the first to third example embodiments and to allocate the function to the receiver units 801, 802, . . . , and 80N, thereby reducing the processing by the A/D converter 81 and the power consumption.

Fifth Example Embodiment

Figure 9:
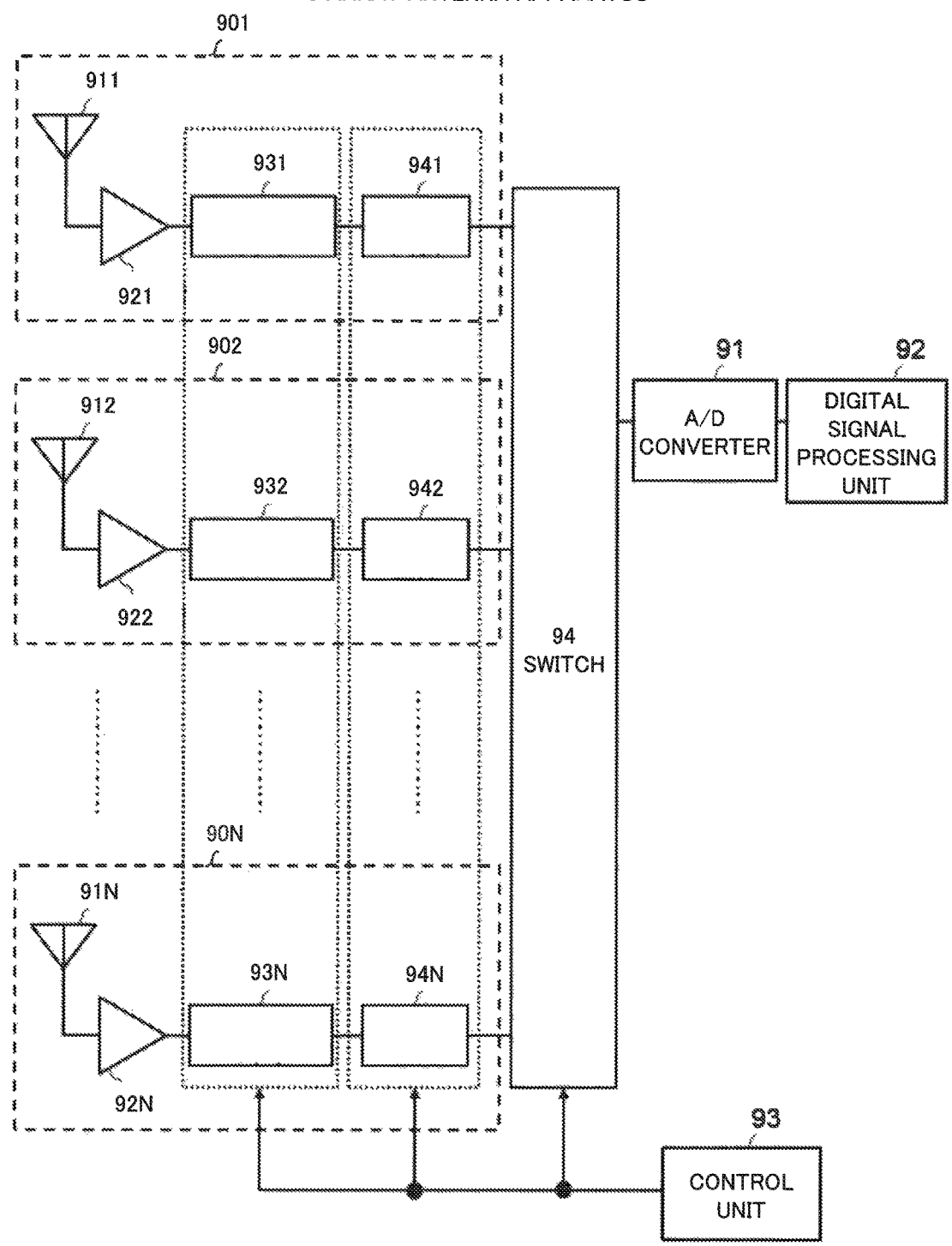
FIG. 9 is a block diagram illustrating a configuration of an array antenna apparatus 9 according to a fifth example embodiment of the present invention.

FIG. 9 is a block diagram illustrating an array antenna apparatus 9 according to a fifth example embodiment of the present invention.

With reference to FIG. 9, the array antenna apparatus 9 according to the fifth example embodiment of the present invention includes receiver units 901, 902, . . . , and 90N (N is an integer not smaller than 2), the switch 94, the A/D converter 91, the digital signal processing unit 92, and the control unit 93. The array antenna apparatus 9, the switch 94, and the digital signal processing unit 92 have the same functions as the array antenna apparatus 1, the switch 14, and the digital signal processing unit 12 according to the first example embodiment, and will not be described in detail. The receiver units 901, 902, . . . , and 90N have the same functions as the receiver units 401, 402, . . . , and 40N according to the second example embodiment, and will not be described in detail. The A/D converter 91 has the same function as the A/D converter 81 according to the fourth example embodiment, and will not be described in detail. The array antenna apparatus 9 according to the present example embodiment differs from the fourth example embodiment in that the sampling function performed by the sample and hold circuits 861, 862, . . . , and 86N in the fourth example embodiment is provided by the down-converters 831, 832, . . . , and 83N and that the filters 841, 842, . . . , and 84N and the variable gain amplifiers 851, 852, . . . , and 85N are omitted.

The constituent elements included by the array antenna apparatus 9 according to the fifth example embodiment will be described below.

The receiver units 901, 902, . . . , and 90N include respective antennas (antenna elements) 911, 912, . . . , and 91N, respective low noise amplifiers 921, 922, . . . , and 92N, respective sampling mixers 931, 932, . . . , and 93N, and respective hold circuits 941, 942, . . . , and 94N. The antennas 911, 912, . . . , and 91N have the same function as the antennas 111, 112, . . . , and 11N according to the first example embodiment, and will not be described in detail. The low noise amplifiers 921, 922, . . . , and 92N have the same function as the low noise amplifiers 421, 422, . . . , and 42N according to the second example embodiment, and will not be described in detail.

Herein, the configuration up to the sampling mixers 931, 932, . . . , and 93N (the antennas 911, 912, . . . , and 91N, the low noise amplifiers 921, 922, . . . , and 92N, and the sampling mixers 931, 932, . . . , and 93N) is called as the RF unit, which handles radio frequency signals. The configuration subsequent to the sampling mixers 931, 932, . . . , and 93N (the hold circuits 941, 942, . . . , and 94N, the switch 94, the A/D converter 91, and the digital signal processing unit 92) is called as the BB unit, which handles down-converted BB signals. In the BB unit, the configuration prior to the A/D converter 91 (the hold circuits 941, 942, . . . , and 94N and the switch 94) is particularly called as the analog-BB unit, and the configuration including and subsequent to the A/D converter 91 (the A/D converter 91 and the digital signal processing unit 92) is called as the digital-BB unit.

The sampling mixers 931, 932, . . . , and 93N perform down-conversion and sampling of the signals received from the low noise amplifiers 921, 922, . . . , and 92N, and transmit the resulting signals to the hold circuits 941, 942, . . . , and 94N. The low noise amplifiers 921, 922, . . . , and 92N, the sampling mixers 931, 932, . . . , and 93N, and the hold circuits 941, 942, . . . , and 94N are respectively connected one to one to one in series in this order. The sampling mixers 931, 932, . . . , and 93N synchronize the sampling timings based on the third control signal transmitted by the control unit 93.

The hold circuits 941, 942, . . . , and 94N respectively hold the signals received from the sampling mixers 931, 932, . . . , and 93N, and transmit the signals to the switch 94. The sampling mixers 931, 932, . . . , and 93N and the hold circuits 941, 942, . . . , and 94N are respectively connected one to one in series in this order. The hold circuits 941, 942, . . . , and 94N hold the signals based on the first control signal transmitted by the control unit 93. More specifically, the hold circuits 941, 942, . . . , and 94N change the respective hold times of the signals, based on a piece of information contained in the first control signal on the order of transmission by the switch 94 of a plurality of signals, in such a way that the order in which the hold circuits 941, 942, . . . , and 94N transmit the signals to the switch 94 matches that order. In other words, the hold circuits 941, 942, . . . , and 94N set a shortest hold time for the received signal first in the order of transmission to the A/D converter 91 and a longest hold time for the received signal last in the order of transmission to the A/D converter 91. For example, when the first control signal contains a piece of information indicating that the signals of the receiver units 901, 902, . . . , and 90N are to be transmitted to the A/D converter 91 in this order (the receiver units 901→902→ . . . →90N), the hold circuits 941, 942, . . . , and 94N make the respective hold times increasingly longer in this order.

The sampling mixers 931, 932, . . . , and 93N and the hold circuits 941, 942, . . . , and 94N have been described above as separate constituent elements. However, these may be unitary circuits.

Further, the array antenna apparatus 9 according to the present example embodiment may include RF filters between the low noise amplifiers 921, 922, . . . , and 92N and the sampling mixers 931, 932, . . . , and 93N. This allows the adoption of a direct RF configuration.

The array antenna apparatus 9 according to the fifth example embodiment is provided with the sampling mixers 931, 932, . . . , and 93N respectively in the receiver units 901, 902, . . . , and 90N. Similarly to the fourth example embodiment, this allows the array antenna apparatus 8 to separate the sampling function performed by the A/D converter in the first to third example embodiments and to allocate the function to the receiver units 901, 902, . . . , and 90N, thereby reducing the processing by the A/D converter 91 and the power consumption.

Sixth Example Embodiment

Figure 10:
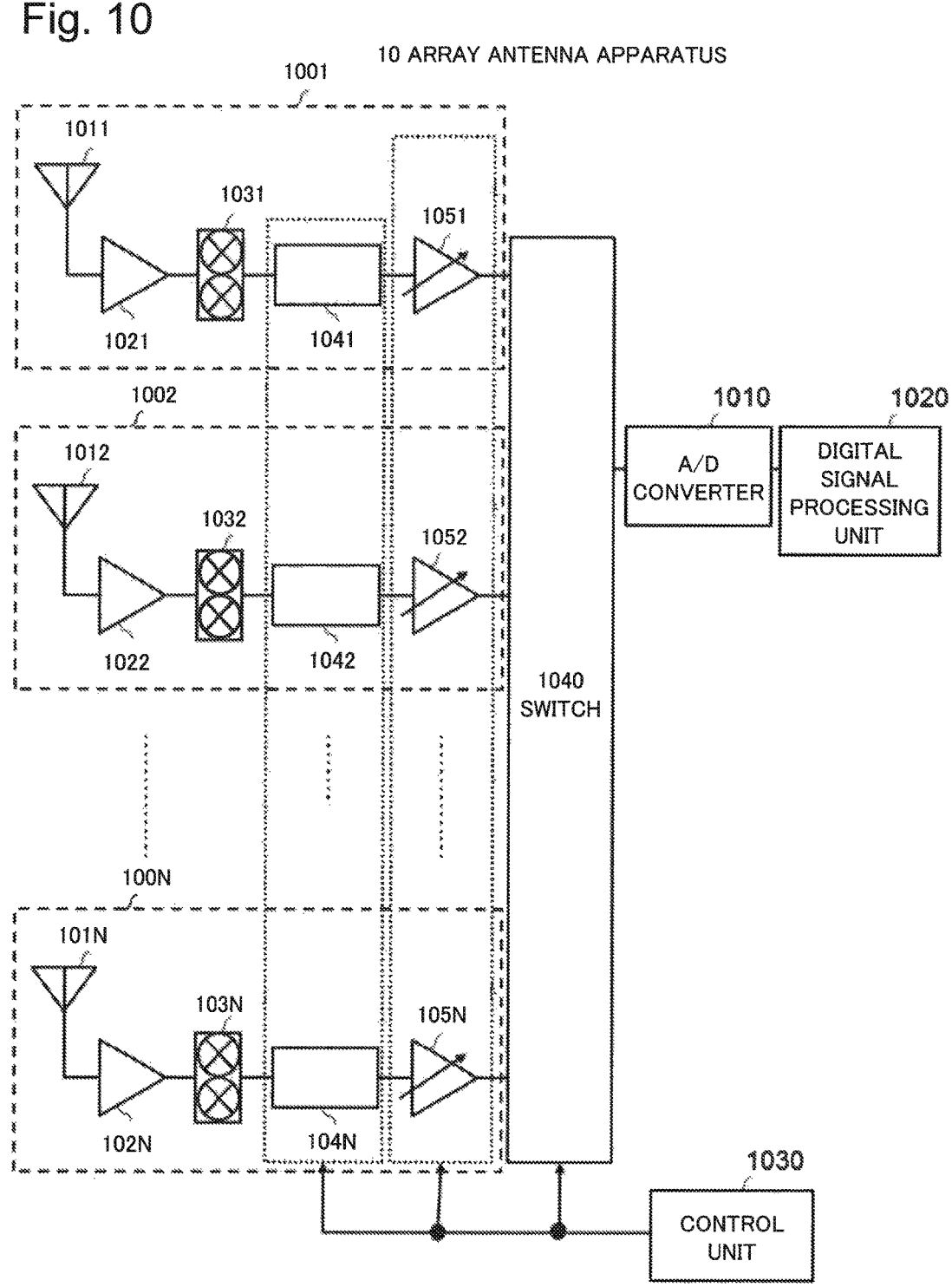
FIG. 10 is a block diagram illustrating a configuration of an array antenna apparatus 10 according to a sixth example embodiment of the present invention.

FIG. 10 is a block diagram illustrating an array antenna apparatus 10 according to a sixth example embodiment of the present invention.

With reference to FIG. 10, the array antenna apparatus 10 according to the sixth example embodiment of the present invention includes receiver units 1001, 1002, ..., and 100N (N is an integer not smaller than 2), a switch 1040, an A/D converter 1010, a digital signal processing unit 1020, and a control unit 1030. The array antenna apparatus 10, the switch 1040, the A/D converter 1010, the digital signal processing unit 1020 have the same functions as the array antenna apparatus 1, the switch 14, the A/D converter 11, and the digital signal processing unit 12 according to the first example embodiment, and will not be described in detail. The receiver units 1001, 1002, ..., and 100N and the control unit 1030 have the same functions as the receiver units 401, 402, ..., and 40N and the control unit 43 according to the second example embodiment, and will not be described in detail. The array antenna apparatus 10 according to the present example embodiment differs in that it includes variable filters 1041, 1042, ..., and 104N instead of the filters 441, 442, ..., and 44N in respective receiver units 401, 402, ..., and 40N according to the second example embodiment.

The constituent elements included by the array antenna apparatus 10 according to the sixth example embodiment will be described below.

The receiver units 1001, 1002, ..., and 100N include respective antennas (antenna elements) 1011, 1012, ..., and 101N, respective low noise amplifiers 1021, 1022, ..., and 102N, respective down-converters 1031, 1032, ..., and 103N, respective variable filters 1041, 1042, ..., and 104N, and respective variable gain amplifiers 1051, 1052, ..., and 105N. The antennas 1011, 1012, ..., and 101N and the down-converters 1031, 1032, ..., 103N have the same functions as the antennas 111, 112, ..., and 11N and the down-converters 131, 132, ..., and 13N according to the first example embodiment, and will not be described in detail. The low noise amplifiers 1021, 1022, ..., and 102N and the variable gain amplifiers 1051, 1052, ..., and 105N have the same functions as the low noise amplifiers 421, 422, ..., and 42N and the variable gain amplifiers 451, 452, ..., and 45N according to the second example embodiment, and will not be described in detail.

Herein, the configuration up to the down-converters 1031, 1032, ..., and 103N (the antennas 1011, 1012, ..., and 101N, the low noise amplifiers 1021, 1022, ..., 102N, and the down-converters 1031, 1032, ..., and 103N) is called as the RF unit, which handles radio frequency signals. The configuration subsequent to the down-converters 1031, 1032, ..., and 103N (the variable filters 1041, 1042, ..., and 104N, the variable gain amplifiers 1051, 1052, ..., and 105N, the switch 1040, the A/D converter 1010, and the digital signal processing unit 1020) is called as the BB unit, which handles down-converted BB signals. In the BB unit, the configuration prior to the A/D converter 1010 (the variable filters 1041, 1042, ..., and 104N, the variable gain amplifiers 1051, 1052, ..., and 105N, and the switch 1040) is particularly called as the analog-BB unit, and the configuration including and subsequent to the A/D converter 1010 (the A/D converter 1010 and the digital signal processing unit 1020) is called as the digital-BB unit.

Of the signals received from the down-converters 1031, 1032, ..., and 103N, the variable filters 1041, 1042, ..., and 104N pass only the signals within a certain (frequency) band to the variable gain amplifiers 1051, 1052, ..., and 105N (hereinafter, a frequency band within which signals are passed is called a pass band). The down-converters 1031, 1032, ..., and 103N, the variable filters 1041, 1042, ..., and 104N, and the variable gain amplifiers 1051, 1052, ..., and 105N are respectively connected one to one to one in series in this order. The variable filters 1041, 1042, ..., and 104N change the pass bands of the signals based on a fourth control signal transmitted by the control unit 1030. More specifically, the variable filters 1041, 1042, ..., and 104N perform the processing of narrowing the pass bands based on the fourth control signal. The pass bands of the variable filters 1041, 1042, ..., and 104N are always identical to one another. Therefore, when the variable filters 1041, 1042, ..., and 104N change the pass bands, the amount of change in the bands will be the same for all the variable filters 1041, 1042, ..., and 104N. By narrowing the pass bands of the signals, the variable filters 1041, 1042, ..., and 104N allow the sampling frequency of the A/D converter 1010 to be lower than usual (than those of the A/D converters according to the first and second example embodiments). For example, when the number of array components is N, the sampling frequency of a non-arrayed antenna (oversampling) is $F_O$, and the band width of the pass bands is set at 1/N of the usual band width, then the sampling frequency $F_S$ of the A/D converter 1010 will be (N/N) times $F_O$, which is $F_O$. In other words, the A/D converter 1010 according to the present example embodiment has no need for oversampling, unlike the first and second example embodiments.

When the signals received by the variable filters 1041, 1042, ..., and 104N include signals within unknown bands, the issue can be addressed by, for example, changing the frequency of LO signals transmitted to the down-converters 1031, 1032, ..., and 103N in the preceding stage and performing the above-described processing more than once.

The control unit 1030 has a function as described below in addition to the functions of the control unit 43 according to the second example embodiment. The control unit 1030 generates the fourth control signal to change the pass bands of the signals of the variable filters 1041, 1042, ..., and 104N, and transmits the generated fourth control signal to each of the variable filters 1041, 1042, ..., and 104N. The fourth control signal contains a piece of information in accordance with which the variable filters 1041, 1042, ..., and 104N narrow the pass bands by an equal amount.

In the above, the first, second, and fourth control signals are described as being generated by one and the same control unit 93. However, these first, second, and fourth control signals may be generated by a plurality of control units (not illustrated).

The array antenna apparatus 10 according to the sixth example embodiment is provided with the variable filters 1041, 1042, ..., and 104N respectively in the receiver units 1001, 1002, ..., and 100N. This allows the variable filters 1041, 1042, ..., and 104N to narrow the band widths of the signals to be processed by the A/D converter 1010. In other words, the array antenna apparatus 10 can perform the A/D converter processing at a sampling rate lower than usual, thereby operating at a reduced power consumption.

Seventh Example Embodiment

Figure 11:
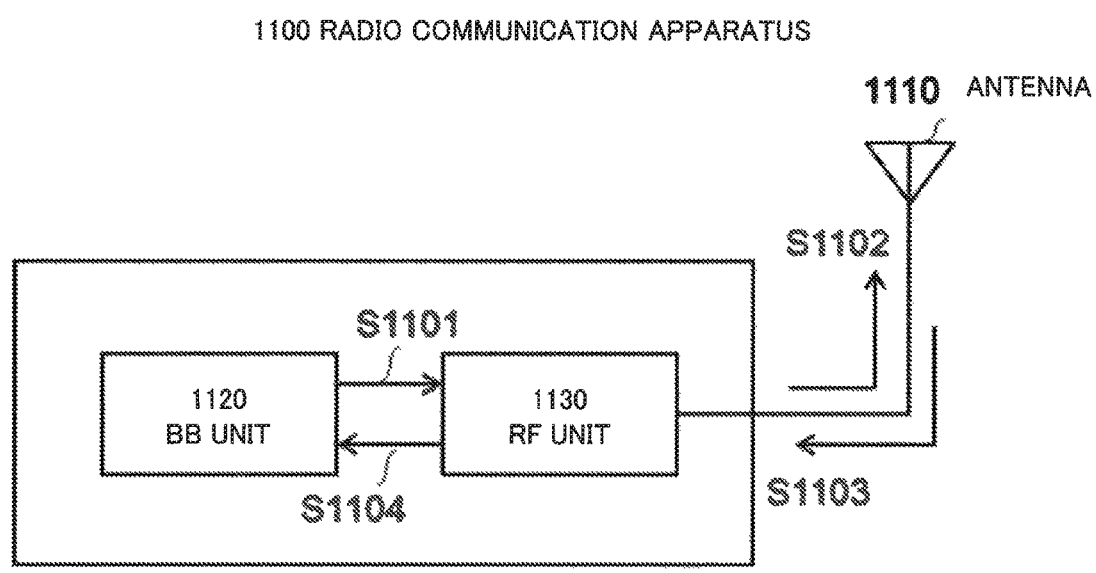
FIG. 11 is a block diagram illustrating a configuration of a radio communication apparatus 1100 according to a seventh example embodiment of the present invention.

A radio communication apparatus 1100 according to a seventh example embodiment will be described below. FIG. 11 is a block diagram schematically illustrating a configuration of the radio communication apparatus 1100 according to the seventh example embodiment.

The radio communication apparatus 1100 includes an antenna 1110, a BB unit 1120, and an RF unit 1130. The antenna 1110 corresponds to the antennas 111, 112, ..., and 11N according to the first example embodiment. The BB unit 1120 corresponds to the switch 14, the A/D converter 11, and the digital signal processing unit 12 according to the first example embodiment. The RF unit 1130 corresponds to the down-converters 131, 132, . . . , and 13N according to the first example embodiment.

The BB unit 1120 handles BB signals S1101 before modulation or received signals S1102 after demodulation.

The RF unit 1130 modulates BB signals S1101 from the BB unit 1120 and outputs the modulated transmission signals S1102 to the antenna 1110. The RF unit 1130 demodulates the received signals S1103 received by the antenna 1110 and outputs the demodulated received signals S1104 to the BB unit 1120.

The antenna 1110 radiates the transmission signals S1102 and receives the signals S1103, radiated by an external antenna.

It can be seen from the above that, according to the present configuration, a radio communication apparatus capable of making radio communication with the outside can be configured in a concrete manner by using the array antenna apparatus 1 according to the first example embodiment.

Further, according to the present configuration, since the antenna is grounded at its end, it is possible to let electric charge escape to the grounded conductor in the case of a cloud-to-ground discharge, unlike conventional dipole antennas with electrically open ends. This protects the transmitter-receiver connected to the input terminal from a voltage surge caused by a cloud-to-ground discharge.

Although the present invention has been described by example embodiments and concrete examples above, the present invention is not limited to the above-described example embodiments. The structure and details of the present invention can be modified in various ways that can be understood by a person skilled in the art within the scope of the present invention.

The functions of the constituent elements of the example embodiments of the present invention can be performed by, naturally, hardware or by a computer and a program. The program is provided by being stored in a machine-readable storage medium such as a magnetic disk or semiconductor memory and read by a computer at the time of start-up or the like. The program read by the computer controls the computer and causes the computer to perform the functions of the constituent elements of the above-described example embodiments.

The present invention has been described using the above-described example embodiments as exemplary examples. However, the present invention is not limited to the above-described example embodiments. In other words, various aspects that can be understood by a person skilled in the art can be applied to the present invention within the scope of the present invention.

This application is based upon and claims the benefit of priority from Japanese Patent Application No. 2015-90581, filed on Apr. 27, 2015, the disclosure of which is incorporated herein in its entirety by reference.

INDUSTRIAL APPLICABILITY

Applications of the present invention include receivers with a function for direction-of-arrival estimation of signals by utilizing the MMSE method or the MUSIC method.

REFERENCE SIGNS LIST 1, 4, 5, 8, 9, 10 array antenna apparatus
11, 41, 51, 81, 91, 1010 A/D converter
12, 42, 52, 82, 92, 1020 digital signal processing unit
13, 43, 53, 83, 93, 1030 control unit
14, 44, 54, 84, 94, 1040 switch
111 to 11N, 411 to 41N, 511 to 51N, 811 to 81N, 911 to 91N, 1011 to 101N, 1110 antenna
131 to 13N, 431 to 43N, 531 to 53N, 831 to 83N, 1031 to 103N down-converter
201, 202, . . . , 20N waveform of a received signal
210 sampling timing
21, 22, . . . , 2N signal sample
301 simulation result of a conventional array antenna apparatus
302 simulation result of the array antenna apparatus 1
421 to 42N, 521 to 52N, 821 to 82N, 921 to 92N, 1021 to 102N low noise amplifier
441 to 44N, 541 to 54N, 841 to 84N filter
451 to 45N, 551 to 55N, 851 to 85N, 1051 to 105N variable gain amplifier
561, 562, . . . , 56N, 6, 7 delay device
601, 602, . . . , 60L inverter
61, 62, . . . , 6L MOS switch
701 operational amplifier
861, 862, . . . , 86N sample and hold circuit
931, 932, . . . , 93N sampling mixer
941, 942, . . . , 94N hold circuit
1041, 1042, . . . , 104N variable filter
1100 radio communication apparatus
1120 BB unit
1130 RF unit

What is claimed is:

1. An array antenna apparatus comprising:
a plurality of antennas configured to receive signals;
a plurality of down-converters respectively connected to the plurality of antennas to down-convert the received signals;
a switch to select at least one signal from among the plurality of down-converted signals, and to transmit the at least one signal to an A/D converter; and
a plurality of delay devices to delay the plurality of down-converted signals and to transmit the signals to the switch.

2. The array antenna apparatus according to claim 1, further comprising a first control unit that generates a control signal for controlling delay amounts of the delay devices,
wherein the plurality of delay devices change respective delay amounts based on the control signal.

3. An array antenna apparatus comprising:
a plurality of antennas configured to receive signals;
a plurality of down-converters respectively connected to the plurality of antennas to down-convert the received signals;
a switch to select at least one signal from among the plurality of down-converted signals, and to transmit the at least one signal to an A/D converter; and
a plurality of sample and hold circuits to sample simultaneously the plurality of down-converted signals, to hold samples of the signals, and to transmit the samples of the signals to the switch.

4. The array antenna apparatus according to claim 3, further comprising a second control unit that generates a control signal for controlling hold times of the sample and hold circuits,
wherein the plurality of sample and hold circuits change respective hold times based on the control signal.

5. An array antenna apparatus comprising:
a plurality of antennas configured to receive signals;
a plurality of down-converters respectively connected to the plurality of antennas to down-convert the received signals, wherein the plurality of down-converters are sampling mixers to sample the down-converted signals simultaneously; and a switch to select at least one signal from among the plurality of down-converted signals, and to transmit the at least one signal to an A/D converter.

6. An array antenna apparatus comprising:
a plurality of antennas configured to receive signals;
a plurality of down-converters respectively connected to the plurality of antennas to down-convert the received signals;
a switch to select at least one signal from among the plurality of down-converted signals, and to transmit the at least one signal to an A/D converter; and
a plurality of variable filters to transmit a certain band of each of the plurality of down-converted signals to the switch.

7. The array antenna apparatus according to claim 6, further comprising a third control unit that generates a control signal for controlling the certain band,
wherein the plurality of variable filters change respective signal pass bands based on the control signal.

8. A method of processing received signals, the method comprising:
down-converting each signal received by a plurality of antennas with down-converters respectively connected with the antennas;
performing one of:
i) delaying the plurality of down-converted signals,
ii) sampling simultaneously the plurality of down-converted signals, and holding samples of the signals, and
iii) passing only a certain band of each of the plurality of down-converted signals; and
sequentially selecting and transmitting to an A/D converter the plurality of down-converted signals.

9. A receiver comprising:
a plurality of antennas configured to receive signals;
a plurality of down-converters respectively connected to the plurality of antennas to down-convert the received signals;
a switch to select at least one signal from among the plurality of down-converted signals, and to transmit the at least one signal to an A/D converter; and
a plurality of delay devices to delay the plurality of down-converted signals and to transmit the signals to the switch.

10. The receiver according to claim 9, further comprising a first control unit that generates a control signal for controlling delay amounts of the delay devices,
wherein the plurality of delay devices change respective delay amounts based on the control signal.

11. A receiver comprising:
a plurality of antennas configured to receive signals;
a plurality of down-converters respectively connected to the plurality of antennas to down-convert the received signals;
a switch to select at least one signal from among the plurality of down-converted signals, and to transmit the at least one signal to an A/D converter; and
a plurality of sample and hold circuits to sample simultaneously the plurality of down-converted signals, to hold samples of the signals, and to transmit the samples of the signals to the switch.

12. The receiver according to claim 11, further comprising a second control unit that generates a control signal for controlling hold times of the sample and hold circuits,
wherein the plurality of sample and hold circuits change respective hold times based on the control signal.

13. A receiver comprising:
a plurality of antennas configured to receive signals;
a plurality of down-converters respectively connected to the plurality of antennas to down-convert the received signals, wherein the plurality of down-converters are sampling mixers to sample the down-converted signals simultaneously; and
a switch to select at least one signal from among the plurality of down-converted signals, and to transmit the at least one signal to an A/D converter.

14. A receiver comprising:
a plurality of antennas configured to receive signals;
a plurality of down-converters respectively connected to the plurality of antennas to down-convert the received signals;
a switch to select at least one signal from among the plurality of down-converted signals, and to transmit the at least one signal to an A/D converter; and
a plurality of variable filters to transmit a certain band of each of the plurality of down-converted signals to the switch.

15. The receiver according to claim 14, further comprising a third control unit that generates a control signal for controlling the certain band,
wherein the plurality of variable filters change respective signal pass bands based on the control signal.

* * * * *